June 13, 1944.  K. F. MOLLER  2,351,143
TOOL GUARD
Filed Dec. 6, 1940  2 Sheets-Sheet 1

INVENTOR
K. F. MOLLER
BY Emery Robinson
ATTORNEY

June 13, 1944.    K. F. MOLLER    2,351,143
TOOL GUARD
Filed Dec. 6, 1940    2 Sheets-Sheet 2
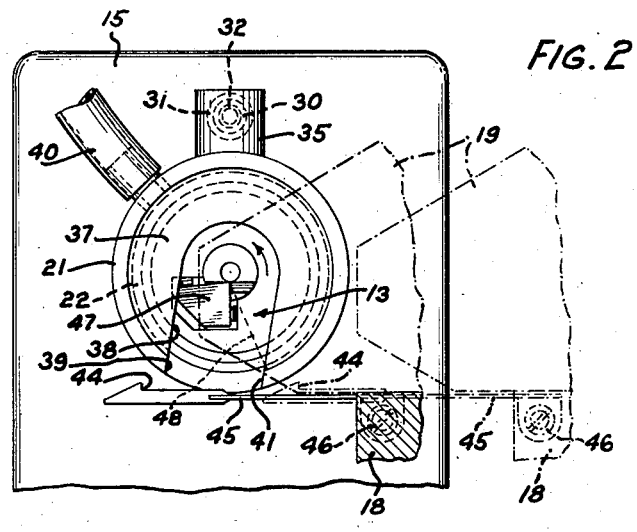
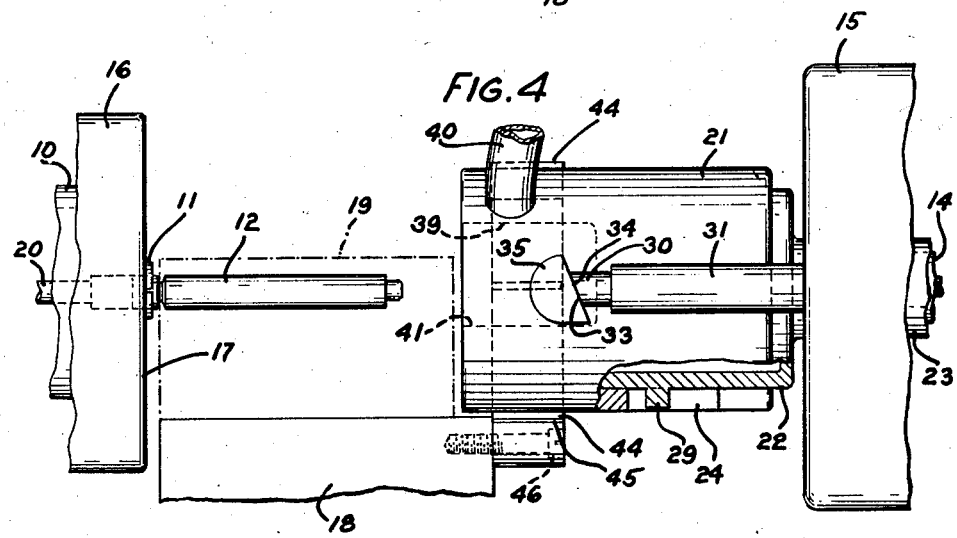
INVENTOR
K. F. MOLLER
BY Emery Robinson
ATTORNEY Patented June 13, 1944

2,351,143

UNITED STATES PATENT OFFICE 2,351,143

TOOL GUARD

Kasper F. Moller, Chicago, Ill., assignor to Western Electric Company, Incorporated, New York, N. Y., a corporation of New York Application December 6, 1940, Serial No. 368,816

10 Claims. (Cl. 82—34)

This invention relates to tool guards and more particularly to guards for automatic work cutting machines.

An object of this invention is to provide a simple and practical guard for an automatic work cutting machine.

In accordance with the above object one embodiment of the invention has been applied to a conventional automatic screw machine. The machine is so adapted that the work piece and turning tool are rotated at high speeds in opposite directions, the tool slide carrying the rotatable tool being moved longitudinally of the work piece and the front cross slide adapted to support a magazine for work pieces which are automatically loaded, by means operated independently from the cam shaft and the rear cross slide, into the work piece chuck. Specifically, the guard of this invention comprises a rotary and slidable spring pressed latchable sleeve surrounding the tool and having a lubricating coolant fluid supply line constantly connected thereto for lubricating and cooling the tool and work piece. In timed relation to the reciprocatory movements of the tool and cross slides the sleeve is moved in such a manner that it is out of the path of the work piece magazine and loading means during their advance movements and the latter are out of the path of the sleeve during the machining operation. The sleeve is so arranged that very hot fast traveling cut material or chips formed during the machining operation engage the inner periphery thereof and are broken off, resulting in a succession of chips of uniform predetermined lengths which are prevented from escaping while hot, are retained in a lubricant and coolant flooded space for a time interval sufficient to be completely cooled off and objectionable fumes and the splashing of lubricant is reduced to a minimum.

Other objects and advantages of this invention will more fully appear from the following detailed description taken in conjunction with the accompanying drawings, in which Fig. 1 is a side view, partly in section, of a tool guard embodying the features of this invention as applied to a conventional automatic screw machine, shown fragmentarily and partly in section, the guard and tool head being shown in their retracted positions relative to the work piece;

Fig. 2 is a vertical section taken on the line 2—2 of Fig. 1;

Fig. 4 is a plan view, partly in section, of Fig. 1.

Figure 1:
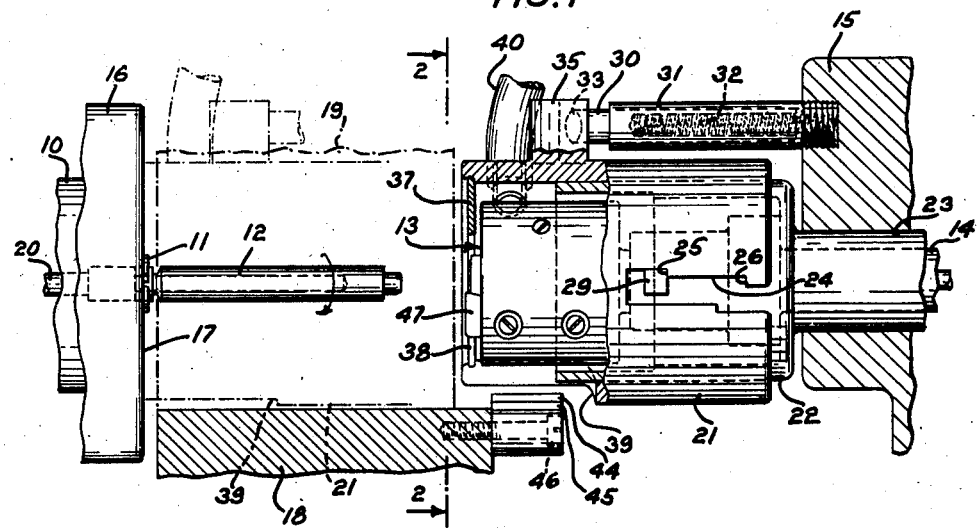

Referring now to the drawings, one embodiment of this invention is shown applied, for example, to a conventional automatic screw machine, shown fragmentarily, employing a single work piece rotating spindle, indicated at 10, to which is attached a chuck 11 for gripping a work piece 12, the spindle and chuck being continuously rotated. A turning tool is indicated in general at 13 which is carried by and constantly driven by a spindle 14. For a detailed illustration and description of the turning tool 13 reference may be had to United States Patent No. 2,323,834, dated July 6, 1943. The tool spindle 14 is mounted on a tool slide 15 which is advanced periodically to carry the tool 13 into operative cutting relation with the forward end of the rotating work piece 12 and as the slide continues its advance the tool turns down the work piece, which is rotating about a fixed axis, to the desired diameter. In a retracted position of the tool 13 the work piece 12 previously worked upon is ejected and a partially formed work piece to be turned down is loaded into the chuck 11. The spindle 14 during its reciprocatory movements with the tool slide 15 is continuously rotated and in order to increase the cutting speed the work piece and tool carrying spindles 10 and 14, respectively, are driven at high speeds in opposite directions. The work piece spindle 10 is suitably journaled in a bearing (not shown) enclosed in a stationary housing 16, the chuck 11 freely rotating in an opening formed in an end wall 17 of the housing and extending a short distance outside thereof. A front cross slide is indicated at 18 and opposite the same is a rear cross slide (not shown).

By mechanisms well known in the art the work piece and tool carrying spindles 10 and 14, respectively, are continuously rotated and the tool, front and rear cross-slides as well as the chuck 11 are periodically actuated in timed relation to each other. Also, in timed relation to the reciprocatory movements of the tool 13 the partially formed work piece to be turned down is automatically loaded by means (not shown) carried on the rear cross-slide into the chuck 11 from a supply magazine indicated fragmentarily in broken outline at 19 (Figs. 2 and 4) and a completely turned work piece is automatically ejected from the chuck by an ejector rod 20. The details of the above referred to mechanisms and elements have been omitted from the present application for the sake of simplicity, since a full disclosure of the particular construction of the turning tool, the various driving and actuating mechanisms and the work piece supply magazine and workpiece loading means is not essential to a complete understanding of this invention.

The tool guard of this invention, referring particularly to Figs. 1 and 2 comprises a circular sleeve 21 which surrounds the turning tool 13 and is slidably and rotatably supported on a cup-like member 22 on the end of a bearing 23 for the tool spindle 14, the bearing being fixed in the tool slide 15. At its right end, as viewed in Fig. 1, the sleeve 21 is formed with a longitudinally extending bayonet slot 24, one edge of which is formed with latching faces 25 and 26, which cooperate in the operation of the guard with a latch pin 29, carried by the member 22. A spring pressed plunger 30 is slidably carried in a housing 31 fixed to the tool slide 15 and is normally urged toward the left, as viewed in Fig. 1, by a compression spring 32. An angular end surface 33 of the plunger is at all times engaged with a similar angular surface 34 on a lug 35 on the guard sleeve 21, the angular surfaces 33 and 34 cooperating during one period in the operation of the guard to effect a slight rotary movement of the guard sleeve 21 in a clockwise direction, as viewed in Fig. 2, to latch the sleeve into the position clearly shown in Fig. 1.

Inserted in the left end of the sleeve 21 is a wall 37 (Fig. 1) having its peripheral edge secured in a groove formed in the inner surface of the sleeve. A slot 38 is cut in the wall 37 to clear the work piece as the latter is turned down by the tool 13, the slot extending for a suitable distance around the axis of the tool and out to the sleeve 21 where the opposed parallel sides of the slot join similarly spaced sides of a slot 39 formed in the wall of the sleeve. During the operation of the screw machine a lubricating coolant fluid is constantly pumped into the guard sleeve 21 through a flexible hose 40 which is connected to a suitable supply source (not shown).

Figure 3:
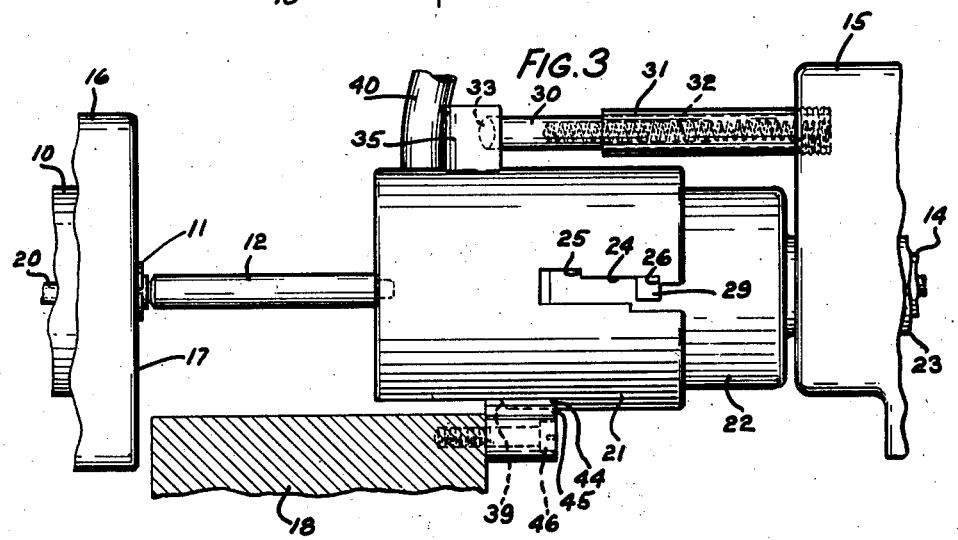
Fig. 3 is a view similar to Fig. 1 showing the guard in an unlatched advanced position relative to the work piece and tool head.

The slots 38 and 39 permit the passage of chips and fluid from the guard sleeve 21 and one of the opposed parallel side faces of the slot 39, indicated at 41, provides a surface for a pawl 44, carried on the end of a flexible support 45 secured, as indicated at 46, to the front cross slide 18, to engage during the retraction of the slide from the full line position to the dotted line position, shown in Fig. 2. During this latter movement of the slide 18 the pawl 44 engages the side face 41 of the guard sleeve slot 39 and rotates the sleeve in a counterclockwise direction, as viewed in Fig. 2, for a distance sufficient to unlatch the latching face 25 from the latch pin 29 whereupon the spring pressed plunger 30 slides the guard sleeve 21 to the left to the position shown in Fig. 3, its movement being limited by the engagement of the latching face 26 with the pin 29.

In the operation of the above type of screw machine equipped with the described embodiment of tool guard, it will be assumed that the machine is in operation and at the particular period in its operating cycle, as shown in Figs. 1 and 2, the work piece 12 has just been automatically loaded by the previously mentioned means carried on the rear cross slide (not shown) into the rotating chuck 11 from the supply magazine 19, previously advanced with the front cross slide 18 from the right hand to the left hand broken outline position thereof, as shown in Fig. 2 and, as indicated in Fig. 1, into the clear space between the stationary end wall 17 of the work piece spindle housing 16 and the left end of the latched guard sleeve 21. The slide 18 is next retracted to carry the magazine 19 to its right hand position (Fig. 2) and it will be noted that in this position it is out of the path of the guard sleeve 21. During the final portion of this retractive movement of the slide 18 the pawl 44, carried on the flexible support 45 attached to the slide, engages the side face 41 of the slot 39 in the sleeve 21 and rotates it counterclockwise (Fig. 2), whereupon the latching face 25 of the bayonet slot 24 is unlatched from the pin 29 (Fig. 1). The spring pressed plunger 30 immediately advances the sleeve 21 upon its support 22 toward the end wall 17 of the work piece spindle housing 16 until the latching face 26 of the bayonet slot 24 engages the latch pin 29.

In timed relation with this advance movement of the sleeve 21 upon the support 22 and the retraction of the front cross slide 18 the tool slide 15 is advanced to carry a tool blade 47 (Figs. 1 and 2) of the rotating turning tool 13 into operative cutting relation with the rotating work piece 12. During the continued advance movement of the slide 15 during which the turning operation upon the work piece 12 is effected, the guard sleeve 21 remains in the last described position upon its support 22 until its forward end engages the end wall 17 of the work piece spindle housing 16, as indicated in dotted lines in Fig. 1. Thereafter in the continued advance of the tool slide 15 the guard sleeve 21 is pressed rearwardly upon its support 22 until the latching face 25 of the bayonet slot 24 is aligned with the right hand side of the pin 29 (Fig. 1) whereupon, due to the constant cooperating action of the angular surfaces 33 and 34 of the spring pressed plunger 30 and lug 34, respectively, tending to rotate the guard sleeve in a clockwise direction, the sleeve is rotated clockwise and the latching face 25 is moved into latching relation with the latch pin 29, as shown in Fig. 1. During this last movement of the sleeve 21 the spring 32 is compressed. The bayonet slot 24 is of such length forward of the latching face 25 that suitable movement of the sleeve 21 upon its support 22 after the latching operation may take place to permit the slide 15 to continue its advance to complete the turning operation by the tool blade 47. Upon completion of the turning operation, the tool slide 15 and the guard sleeve 21 are retracted to the position shown in Fig. 1, in which position the space between the left end of the sleeve 21 and the end wall 17 of the work piece spindle housing 16 is clear for the advance, after the ejection of the turned work piece 12 from the chuck 11 by means of the ejector rod 20, of the magazine 19 on the front cross slide 18 and the loading means on the rear cross slide (not shown) for reloading the chuck with a work piece. This completes a cycle of operation of the guard sleeve 21 during an operating cycle of the screw machine.

It is to be understood that during the operation of the screw machine and guard sleeve 21, as above described, a constant stream of lubricating coolant fluid is being pumped through the flexible hose 40 from a suitable supply source (not shown) into the chamber within the sleeve 21 surrounding the tool 13 and the work piece, the fluid being in sufficient volume to completely flood the space within the sleeve. During the high speed turning operation the tool and work piece, particularly at the point of cutting, are constantly surrounded with fluid which serves to cool and lubricate the tool as well as the cut material or chips produced. As the outer end of the fast traveling cut material passes from the cutting edge of the tool it engages the inner periphery of the sleeve 21 and is constantly being broken off into a succession of chips of uniform predetermined lengths which finally pass through the guard sleeve slot 39 and are disposed of in the usual manner. The line of travel of the cut material as it passes from the tool is indicated by a broken line 48 in Fig. 2. The very hot fast traveling cut material or chips which first engage the inner periphery of the guard sleeve 21 and thereafter are broken off are not permitted to pass as they are formed directly from the machine with possible injury to attendants, but are retained in the lubricant and coolant flooded space in the guard for a time interval sufficient to be completely cooled off and this also reduces to a minimum objectionable fumes and the splashing of lubricant.

To remove the guard sleeve 21 from its support 22, the sleeve is first rotated to unlatch the sleeve face 25 from the latch pin 29. This is done while the tool slide 15 is in its fully retracted position (Fig. 1) and when no work piece is in the chuck 11. The sleeve 21 is then slid to the left upon the support 22 until the sleeve face 26 engages the pin and thereafter the sleeve is again rotated to unlatch the latter face, whereupon the sleeve is again slid to the left to free it from the support 22.

Although the invention has herein been illustrated and described in connection with one embodiment thereof as applied to a particular type of automatic screw machine, it is to be understood that the novel features thereof are capable of other applications limited only by the scope of the appended claims.

What is claimed is:

1. In an automatic work cutting machine wherein the tool is moved longitudinally of the work by a movable member during the cutting operation, a guard surrounding the tool, means for slidably supporting said guard, means for releasably retaining said guard in a longitudinally retracted position relative to the tool, means for releasing said guard, and means for advancing said guard longitudinally relative to the tool, the guard and tool being advanced thereafter by said movable member while the tool is operating upon the work.

2. In an automatic work cutting machine wherein the tool is moved longitudinally of the work by a movable member during the cutting operation, a guard surrounding the tool, means for slidably and rotatably supporting said guard, means for releasably retaining said guard in a longitudinally retracted position relative to the tool, means for rotating said guard to actuate said retaining means to release the guard, and means effective upon such release to advance the guard longitudinally relative to the tool, the guard and tool being advanced thereafter by said movable member while the tool is operating upon the work.

3. In an automatic work cutting machine wherein the tool is moved longitudinally of the work by a movable member during the cutting operation, a guard spaced from and surrounding the tool for retaining the traveling material as cut from the work, means for slidably supporting said guard, the traveling material being projected against the inner periphery of the guard and broken off into uniform lengths, and means for advancing said guard from a retracted position relative to the tool, the guard and tool being advanced thereafter by said movable member while the tool is operating upon the work.

4. In an automatic work cutting machine wherein the tool is moved longitudinally of the work by a movable member during the cutting operation, a guard sleeve spaced from and surrounding the tool for retaining the traveling material as cut from the work, means for slidably and rotatably supporting said guard, the traveling material being projected against the inner periphery of the sleeve and broken off into uniform lengths, cooperating means on said guard sleeve and supporting means for releasably retaining said sleeve in a retracted position relative to the tool, means for rotating said sleeve to actuate said retaining means to release the sleeve, and means effective upon such release to advance the sleeve relative to the tool, the sleeve and tool being advanced thereafter by said movable member while the tool is operating upon the work.

5. In an automatic work cutting machine wherein the tool is moved longitudinally of the work by a slide during the cutting operation, a guard surrounding the tool, a support for said guard carried by and movable with the slide upon which said guard is reciprocably and rotatably mounted, cooperating latch means on said guard and support for releasably retaining the guard in a retracted position relative to the tool, means for rotating said guard to actuate said latch means to release the guard, means effective upon such release to advance the guard relative to the tool, an abutment arranged to be engaged by the guard in its advance with the tool for returning the guard to its said retracted position relative to the tool, and cooperating means movable with the guard and slide for causing rotation of the guard upon the same reaching its said retracted position and a retaining thereof by said latch means.

6. In an automatic work cutting machine wherein a tool is moved longitudinally of the work by a slide, a guard surrounding the tool, a support carried by and movable with said slide upon which said guard is reciprocably and rotatably carried, cooperating spaced latching and stop means on said guard and support effective to latch the guard in a retracted position relative to the tool and for limiting its movements on its support, a spring pressed plunger carried by said slide and normally acting against said guard to advance the same upon its support when unlatched, means for rotating said guard to actuate said latching means to unlatch the guard, an abutment arranged to be engaged by said guard in its advance with the tool for returning said guard to its said retracted position relative to the tool, and cooperating abutting surfaces on said spring pressed plunger and guard for causing rotation of the guard upon the same reaching its said retracted position and a relatching thereof by said latching means.

7. In an automatic work cutting machine wherein the tool is moved longitudinally of the work by a slide during the cutting operation, a guard sleeve surrounding the tool, a support carried by the slide upon which said sleeve is mounted for reciprocative and rotary motions, said sleeve having a longitudinally extending peripheral slot with spaced latching and stop faces, a latch member carried by the sleeve support extending into said slot for engagement with said latching face for retaining said sleeve in a retracted position relative to the tool, means for rotating said sleeve to release said latching face from said latch member, means effective upon such release to advance said sleeve relative to the tool, such advance being limited by said stop face engaging said latch member, an abutment arranged to be engaged by the sleeve in its advance with the tool for returning the sleeve to its said retracted position relative to the tool, and cooperating means movable with the sleeve and slide for causing rotation of the sleeve upon the same reaching its said retracted position to cause an engagement of said latching face with said latch member.

8. In an automatic screw machine wherein the tool is moved longitudinally of the work by a slide and which machine includes a cross slide, a guard surrounding the tool, a support for said guard carried by and movable with the tool slide upon which said guard is reciprocably and rotatably mounted, cooperating means on said guard and support for releasably retaining the guard in a retracted position relative to the tool, said guard having a pawl engaging surface, a yieldably mounted pawl carried by the cross slide arranged to engage said guard surface during the retraction of the cross slide for rotating said guard to release the same, means effective upon such release to advance the guard relative to the tool, an abutment arranged to be engaged by the guard in its advance with the tool for returning the guard to its said retracted position relative to the tool, and cooperating transversely extending angular abutting surfaces carried by the guard and tool slide for causing rotation of the guard upon the same reaching its said retracted position and a retaining thereof by said retaining means.

9. In an automatic screw machine wherein the tool is moved longitudinally of the work by a tool slide and which machine includes a cross slide, a guard sleeve surrounding the tool, a support carried by and movable with the tool slide upon which said sleeve is mounted for reciprocative and rotary motions, said sleeve having a longitudinally extending peripheral slot with spaced latching and stop faces, a latch member carried by the sleeve support extending into said slot for engagement with said latching face for retaining said sleeve in a retracted position relative to the tool, said sleeve having a pawl engaging surface, a yieldably mounted pawl carried by the cross slide arranged to engage said sleeve surface during the retraction of the cross slide for rotating said sleeve to release said latching face from said latch member, means effective upon such release to advance the sleeve relative to the tool, such advance being limited by said stop face engaging said latch member, an abutment arranged to be engaged by the sleeve in its advance with the tool for returning the sleeve to its said retracted position relative to the tool, and cooperating transversely extending angular abutting surfaces carried by the sleeve and tool slide for causing rotation of the sleeve upon the same reaching its said retracted position to cause an engagement of said latching face with said latch member.

10. In an automatic screw machine wherein the tool is moved longitudinally of the work by a slide, a guard sleeve surrounding the tool, a support for said sleeve carried by and movable with the slide upon which said sleeve is reciprocably and rotatably mounted, a lubricant supply means connected to said sleeve for directing lubricant thereinto and upon the tool, said sleeve having a slot in a lower portion of its peripheral wall for the passage therefrom of lubricant and chips, cooperating means on said sleeve and support for releasably retaining the sleeve in a retracted position relative to the tool, means operable for rotating said sleeve to release the same, means effective upon such release to advance the sleeve relative to the tool, an abutment arranged to be engaged by the sleeve in its advance with the tool for returning the sleeve to its said retracted position relative to the tool, and cooperating means movable with the sleeve and slide for causing rotation of the sleeve upon the same reaching its said retracted position and a retaining thereof by said retaining means.

KASPER F. MOLLER.